UNITED STATES PATENT OFFICE.

CARL OSKAR MÜLLER, OF BASLE, SWITZERLAND, ASSIGNOR TO BASLE CHEMICAL WORKS BINDSCHEDLER.

BLUE TETRAZO DYE.

SPECIFICATION forming part of Letters Patent No. 524,069, dated August 7, 1894.

Application filed April 5, 1894. Serial No. 506,383. (Specimens.)

*To all whom it may concern:*

Be it known that I, CARL OSKAR MÜLLER, a subject of the German Emperor, residing at Basle, Switzerland, have invented certain new and useful Improvements in the Manufacture of Tetrazoic Coloring-Matters, of which the following is a specification.

This invention relates to the manufacture of new coloring matters derived from a new dioxy-naphthalene-monosulfoacid (OH.OH. $SO^8H$=1.7.4) obtained by the fusion of the alpha-oxynaphthoic disulfoacid (OH.COOH.$SO_3$ H.$SO_3H$=1.2.4.7) with caustic alkali at a temperature of 230° to 290° centigrade.

In a pending application, Serial No. 506,384, I have described a method of producing tetrazoic coloring matters, but I do not herein claim the method and product therein described.

These new coloring matters dye unmordanted cotton, in an alkaline bath, and are obtained by the combination of one molecule of the said dioxy-naphthalene-monosulfoacid with one molecule of the tetrazo derivative of an aromatic para-diamido-compound, such for instance as tetrazodiphenyl and its homologues, tetrazooxydiphenyl-alkyl-ethers, tetrazodioxydiphenyl-alkylethers, tetrazo-stilbene and tetrazo azobenzene and its homologues, and the subsequent combination of the intermediate product thus obtained with one molecule of a sulfo-derivative of a naphthol compound, such for instance as alpha- and beta-naphthol-sulfo-acids, oxynaphthol-sulfo acids (dioxy-naphthalene-sulfo-acids), amidonaphthol-sulfo-acids and carboxyl-oxy-naphthol-sulfo acids (dioxynaphthoic-sulfo acids.

*Production of the new dioxynaphthalene-mono-sulfo acid* (OH.OH.$SO_3H$=1.7.4).—Fifty kilos of the sodic salt of the oxynaphthoic disulfo acid are melted with two hundred kilos caustic soda or caustic-potash at a temperature of 230° to 290° centigrade for a few hours. The melt is then dissolved in water, acidulated with a mineral acid, neutralized with sodium carbonate and filtered. The liquor thus prepared has a characteristic blue violet fluorescence and contains the new dioxy-naphthalene sulfo acid (1.7.4). It can be used directly for the manufacture of the coloring matters.

By way of example, I will describe specifically the method employed for obtaining two of the new coloring matters derived from this new dioxy-naphthalene-mono-sulfo acid.

I. *A coloring matter obtained by the combination of one molecule of the tetrazo-derivative from dianisidin with one molecule of the new dioxy-naphthalene-mono-sulfo-acid and one molecule of the disulfo acid of the beta-naphthol R.*—Twenty-four kilos dianisidin dissolved with fifty-two kilos concentrated hydrochloric acid and two hundred and fifty liters of water are diazotised with a solution of fourteen kilos sodium nitrite in fifty kilos of water. The liquor containing the diazo compound is then poured into a solution of twenty kilos of sodium carbonate and of twenty-seven kilos of the sodic salt of the dioxy-naphthalene mono-sulfo acid 1.7.4 prepared according to the previous description. After stirring the liquor for some time all the tetrazo-compound is transformed into an intermediate combination. A quantity equal to thirty-five kilos of the disulfo acid of the beta-naphthol R, is then added. When the combination is terminated, the temperature of the liquor is raised, preferably by steam heat, to about 100° centigrade and then the coloring matter is salted, filtered and dried.

The new coloring matter dyes unmordanted cotton a fast, greenish blue. It is soluble in water and in concentrated sulfuric acid with a greenish blue color. It is a brown powder with metallic luster.

In the above example, for the tetrazo-derivative of dianisidin can be substituted tetrazo-diphenyl and its homologues, ethers of tetrazo-oxydiphenyl, tetrazo-stilbene, tetrazo-azo-benzene and its homologues, and for the molecule of the disulfo acid of the beta-naphthol R can be substituted an equivalent quantity of an analogous derivative of naphthol, also furnishing coloring matter, as for instance the various naphthol sulfo acids, oxynaphthol sulfo acids, amido naphthol sulfo acids, and carboxyl-oxy-naphthol sulfo acids, and thus the tint of the coloring matter can be varied at will. One molecule of the following bodies can be thus combined with the intermediate product of one molecule of a tetrazo body and one molecule of the new dioxy-naphthalene mono-sulfo acid: (a) mono-sulfo acid, of the alpha-naphthol (alpha 1 alpha 2); (b) mono-sulfo acid of the beta-naphthol (Schaeffer); (c) mono-sulfo acid of the beta-naphthol (F); (d) mono-sulfo acid of the dioxy-naphthalene (OH.OH.SO$_3$H=1.7.4); (e) disulfo acid of the beta-naphthol (F); (f) di-oxy-naphthalene mono-sulfo acids obtained by alkaline fusion of the naphtholdisulfo acid R$a$G of the German Patent No. 3,229, or of the naphthol-disulfo acid E of the German Patent No. 45,776, or of the beta-naphthol-di-sulfo acid F of the German Patent No. 44,070; (g) mono- and disulfo acids of the amido-naphthol alpha 1—alpha 4; (h) mono- and di-sulfo acids of the dioxy-naphthalene alpha 1—alpha 4; (i) dioxy-naphthoic sulfo acid of the German Patent No. 67,000; (j) beta-amido-naphthol-gamma-sulfo acid.

II. *A coloring matter obtained by the combination of one molecule of the tetrazo-derivative of tolidine with one molecule of the new dioxy-naphthalene-mono sulfo acid and one molecule of the naphthol-sulfo acid alpha 1—alpha 2.*—Twenty-one kilos of tolidin dissolved in five hundred liters of water and fifty-five kilos of concentrated hydrochloric acid are diazotised at a temperature of 0° to 5° centigrade with a solution of fourteen kilos of sodium nitrite. When the tetrazo-compound is formed, the liquor is run into a solution of twenty-eight kilos of the new dioxy-naphthalene mono sulfo acid and twenty kilos of soda ash. After the formation of the intermediate compound, twenty-five kilos of the sodic salt of the naphthol sulfo acid alpha 1—alpha 2 are added.

The formation of the coloring matter is completed in from twenty-four to forty-eight hours. The liquor is then heated, preferably by steam, and the dyestuff is precipitated by salt, filtered and dried. It dyes unmordanted cotton a violet blue. This coloring matter is soluble in water with a reddish blue coloration and in concentrated sulfuric acid with a blue coloration. It constitutes, when dried, a brown powder having a metallic luster.

Having thus described my invention, I claim—

1. The herein described improvement in the manufacture of coloring matters, which consists in producing a new dioxy-naphthalene mono-sulfo acid by melting alpha oxy-naphthoic disulfo acid (OH.COOH.SO$_3$H.SO$_3$H=1.2.4.7) with caustic alkali at a temperature of 230° to 290° centigrade, as set forth.

2. The herein described improvement in the manufacture of coloring matters, which consists in the production of intermediate products, containing one free diazo group, by the combination of one molecule of the dioxy-naphthalene mono-sulfo acid (OH.OH.SO$_3$=1.7.4) with one molecule of the tetrazo-derivative of an aromatic paradiamido-compound, such for instance as tetrazo-diphenyl and its homologues, tetrazo-oxydiphenyl-alkyl-ethers, tetrazo-dioxydiphenyl-alkyl-ethers, tetrazo-stilbene and tetrazo-azobenzene and its homologues, as set forth.

3. The herein described method of making coloring matters, which consists in the production of tetrazoic coloring matters by the combination of one molecule of the tetrazo-derivative of an aromatic para-diamido-compound with one molecule of the dioxy-naphthalene mono-sulfo acid (OH.OH.SO$_3$H=1.7.4) and the subsequent combination of the intermediate product thus obtained with a sulfo-derivative of a naphthol compound, such, for instance, as the mono-sulfo- and disulfo acids of alpha- and beta-naphthols, the mono-sulfo- and disulfo acids of oxy-naphthols (dioxy-naphthalenes), the mono-sulfo- and disulfo acids of amido-naphthols and the sulfo-acids of carboxylic oxy-naphthols (dioxy-naphthoic sulfo-acids), as set forth.

4. The new blue tetrazoic coloring matter herein described, derived from dianisidin, dioxy-naphthalene mono-sulfo acid (OH.OH.SO$_3$H=1.7.4) and disulfo acid of beta-naphthol, the said coloring matter dyeing unmordanted cotton, in an alkaline bath, a fast greenish blue and constituting, when in a dry state, a brown powder with metallic luster, readily soluble in water and concentrated sulfuric acid with a blue coloration, as set forth.

In witness whereof I have hereunto signed my name in the presence of two subscribing witnesses.

CARL OSKAR MÜLLER.

Witnesses:
GEORGE GIFFORD,
AMAND RITTER.